US012379388B2

(12) United States Patent
Vazirani et al.

(10) Patent No.: US 12,379,388 B2
(45) Date of Patent: Aug. 5, 2025

(54) SAMPLE TRANSPORT UNIT FOR A DIAGNOSTIC MACHINE

(71) Applicant: ERBA DIAGNOSTICS LIMITED, Dublin (IE)

(72) Inventors: Nikhil Vazirani, Mumbai (IN); Sylvain Andlauer, Le Cres (FR); Valentin Ghoris, Montpellier (FR)

(73) Assignee: ERBA DIAGNOSTICS LIMITED, Dublin (IE)

( * ) Notice: Subject to any disclaimer, the term of this patent is extended or adjusted under 35 U.S.C. 154(b) by 1077 days.

(21) Appl. No.: 17/295,125

(22) PCT Filed: Nov. 29, 2019

(86) PCT No.: PCT/EP2019/083156
§ 371 (c)(1),
(2) Date: May 19, 2021

(87) PCT Pub. No.: WO2020/109592
PCT Pub. Date: Jun. 4, 2020

(65) Prior Publication Data
US 2022/0003795 A1    Jan. 6, 2022

(30) Foreign Application Priority Data
Nov. 30, 2018    (FR) ........................... 1872110

(51) Int. Cl.
*G01N 35/04*    (2006.01)
*G01N 35/00*    (2006.01)

(52) U.S. Cl.
CPC ....... *G01N 35/04* (2013.01); *G01N 35/00603* (2013.01); *G01N 2035/00326* (2013.01);
(Continued)

(58) Field of Classification Search
CPC ......... G01N 35/00603; G01N 35/0095; G01N 35/02; G01N 35/04; G01N 35/10;
(Continued)

(56) References Cited

U.S. PATENT DOCUMENTS

2008/0069730 A1    3/2008    Itoh
2012/0216610 A1*   8/2012    Kanayama ......... G01N 35/1011
                                                    73/290 R
(Continued)

FOREIGN PATENT DOCUMENTS

CN    106799362 A       7/2006
EP        2299278 A2    3/2011
WO    2017081410 A1    5/2017

OTHER PUBLICATIONS

PCT Search Report in co-pending PCT Application No. PT/EP2019/083156, mailed Feb. 20, 2020.
(Continued)

*Primary Examiner* — Elizabeth A Robinson
*Assistant Examiner* — Austin Q Le
(74) *Attorney, Agent, or Firm* — Thomas | Horstemeyer, LLP

(57) ABSTRACT

The invention relates to a transport unit for sample containers which enclose samples to be analysed by an automatic diagnosis unit, the unit comprising:
  a transportation route (10) of racks (3) of samples, said route (10) extending according to a first direction (A), said route comprising a first end (102) adapted to receive a rack of samples from a first device and comprising a second end (101) adapted to transmit a rack of samples to a second device;
  a mobile platter (15) comprising a positioning surface extending in a plane;
  an analysis zone (13) arranged inside the positioning surface, and a waiting zone (12) arranged inside the
(Continued)

positioning surface, the analysis zone (13) and the waiting zone (12) being both adapted to receive a rack (3) of samples and being both offset from the transportation route (10);

a rack slider (14) configured to move a rack (3) of samples between the transportation route (10) and the waiting zone (12).

18 Claims, 19 Drawing Sheets

(52) U.S. Cl.
CPC ............... *G01N 2035/0412* (2013.01); *G01N 2035/0465* (2013.01)

(58) Field of Classification Search
CPC . G01N 2035/00326; G01N 2035/0412; G01N 2035/0465; G01N 2035/1088
See application file for complete search history.

(56) References Cited

U.S. PATENT DOCUMENTS

| | | | |
|---|---|---|---|
| 2017/0153261 A1* | 6/2017 | Chida | B25J 15/0038 |
| 2018/0292426 A1* | 10/2018 | Abe | G01N 35/026 |
| 2019/0339295 A1* | 11/2019 | Makino | B01L 3/5085 |

OTHER PUBLICATIONS

Search Report in co-pending French Application No. 1872110, mailed Oct. 28, 2019.

* cited by examiner

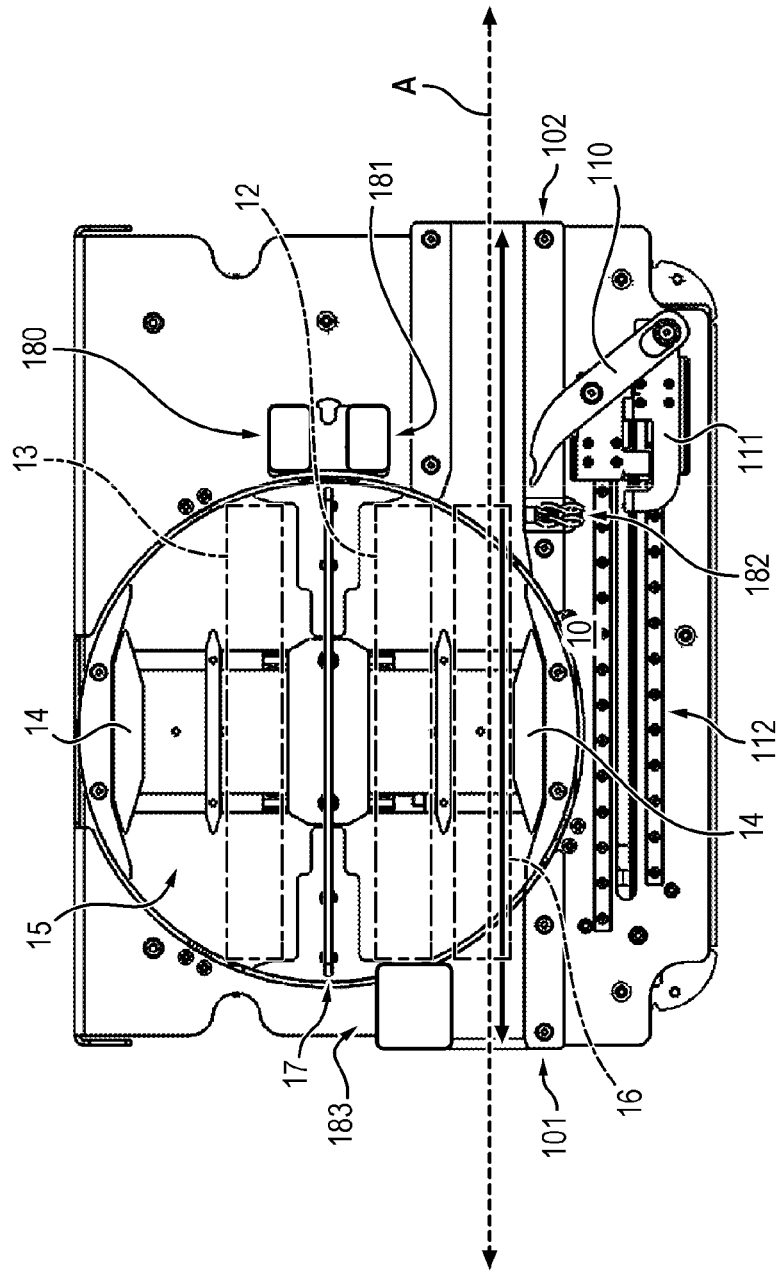

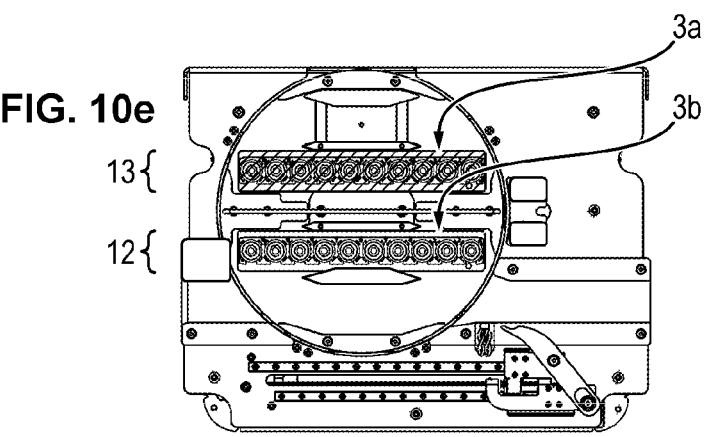
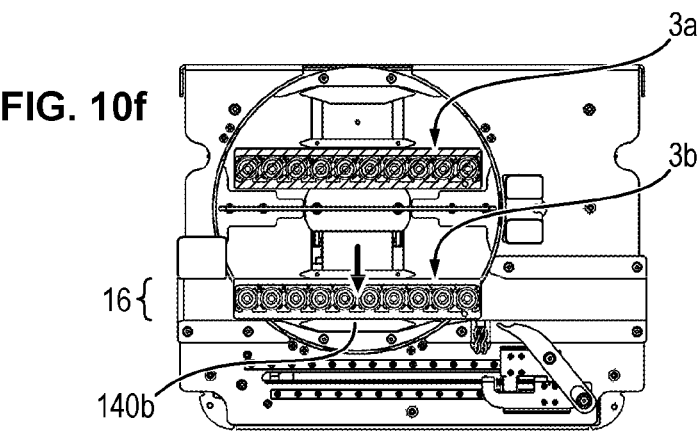
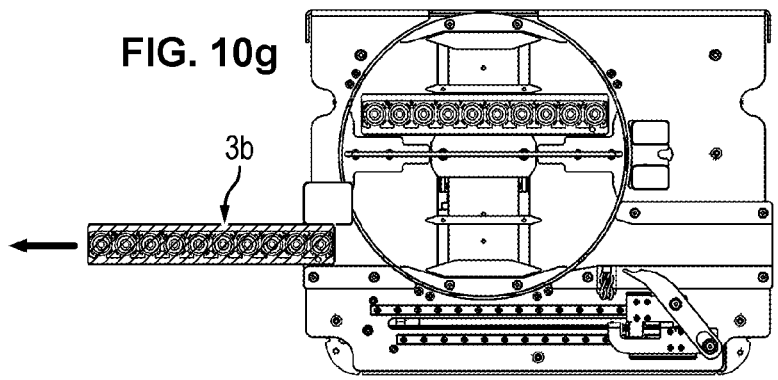

SAMPLE TRANSPORT UNIT FOR A DIAGNOSTIC MACHINE

CROSS REFERENCE TO RELATED APPLICATIONS

This application is the 35 U.S.C. § 371 national stage application of PCT Application No. PCT/EP2019/083156, filed Nov. 29, 2019, which application claims the benefit of French Application No. FR 1872110, filed Nov. 30, 2018, both of which are hereby incorporated by reference herein in their entireties, including any figures, tables, nucleic acid sequence, amino acid sequences, or drawings.

TECHNICAL FIELD OF THE INVENTION

The invention relates to the field of medical analysis instruments, especially in haematology and diabetology.

The invention relates more particularly to a transport unit of samples, for an automatic unit for sampling and analysis of samples of body fluids for diagnosis, as well as an automatic unit comprising one or more such transport units.

PRIOR ART

The processing and analysis of samples of body fluids of individuals, such as samples of blood or urine, is now automated for the most part. The samples are stored in containers which each have an own identifier for tracing back to an individual, transported in series on an analysis route.

Analysis consists for example of biochemical or physiological measuring. The analysis is conducted by an analyser, linked to a handling unit of samples which moves the samples one by one a the suite on an analysis path. Several phases must be respected for each sample: agitation for a predetermined period, identification for associating the results with an individual, incubation, transfer, counting, etc. The total duration of all these phases placed end on end is of the order of a minute.

The tubes of samples are generally transported combined in racks to make for easier laboratory handling of samples and to ensure the rate of analysis, measured in a number of samples processed per hour.

The mechanical apparatus which carries out the transport of racks of samples, also called "auto-sampler", is placed vertically in the lower part of the analyser.

In some existing devices a file of racks extends under the analyser and the analysis route takes a sample at a given position of the file. The order of introduction of the racks on the file defines the order of analysis of the samples. In this configuration, the principal axis of acceleration of the rate of analysis consists of moving immediately to the following rack once all the tubes of the current rack have been analysed.

In some devices among these existing devices, the racks are transported in file in a direction perpendicular to the direction of alignment of the tubes. The direction of transport extends according to the width of the file.

However, this solution imposes an order of analysis completely sequential and dependent on the order of introduction of the racks. To perform analyses following another order of priority, the sole solution is the manual introduction of an "urgent" sample.

There are many cases where a non-sequential order of analysis is preferable, without it being preferable to introduce one or more samples manually.

For example, it can be preferred to prioritize a given sample or a rack, even if it is not at the front of the file.

Also, it is preferable that the automatic diagnosis unit authorises times when the sample is made to wait after analysis, to determine whether an additional test proves necessary. The waiting time corresponds to a time for obtaining a first test result. Now, in existing systems, any waiting time imposed on a sample impacts on the following racks of the file.

For example, it is common in the field to conduct additional tests of "Rerun" type according to current terminology (a new iteration of the initial test to specify or verify a measuring result in case of suspicion of error) or of "Reflex" type (secondary tests conducted on one sub-set of tubes only).

International patent application WO 2017/081410 describes an automatic diagnosis unit comprising a sample changer which takes samples independently of their order positioning in racks. The sample changer is controlled by a scheduler which manages the sampling actions to optimise their rate. The sampling order is determined by an optimisation algorithm of the scheduler.

This automatic diagnosis unit however has considerable bulk. Its operation is complex and causes risks of mechanical malfunction linked to multiples movements in rotation of racks and to the vertical elevation of these racks on several levels. Also, this automatic unit is not provided to be easily placed in series with other automatic units, since the orientation of racks is perpendicular to the communication path between automatic units, preferably from left to right or from right to left facing the instrument.

European patent application EP 2 299 278 describes (see FIG. 4) a transport unit of racks comprising three routes for racks to pass. The first route and the second route correspond to the same direction of passage, respectively with or without passing via the analyser; the samples needing no analysis can pass through the transport unit faster to optionally reach another consecutive analyser. The third route allows racks to pass in the opposite direction.

This last solution however, which limits the restrictions of rack traffic, is not only mechanically complex and difficult to manage, but also bulky.

None of the systems of the prior art ensures satisfactory performance with moderated bulk, especially if flexibility in the order of analysis of samples is required.

The performance of automatic diagnosis units comprises the rate of analysis but also the reliability of results obtained. In particular, excessive shortening of the agitation phase, for example under 10 seconds, greatly harms the reliability of analyses, as does excessively long agitation.

Another performance criterion is the capacity to process different kinds of tests. For example, some samples may need highly specific Reflex tests, such as fluorescence tests, or specific processing events which the majority of analysers do not propose.

The aim therefore is to let the end user of the automatic diagnosis unit concatenate several analysers which do not necessarily ensure the same types of tests, and which therefore do not necessarily have the same rate, especially for processing the same sample in several fields (for example haematology and diabetology).

It is in fact barely advantageous to concatenate analysers comprising transport units in series as a sequential operation, since the slowest analyser imposes its lowest rate on the entire system.

GENERAL PRESENTATION OF THE INVENTION

The need therefore arises for a transport unit capable of ensuring an optimal rate for analysis of samples contained in vials or in tubes, with reduced impact on waiting times or isolated "urgent" samples on the rate of analysis.

Especially, the need arises for a transport unit which easily returns analyses to samples having already formed the object of first tests, very quickly after the end of the first tests, without greatly disrupting the rate of analysis.

Another need is to obtain a transport unit of minimal bulk, with rack displacements of moderate complexity.

There is an additional need for a transport unit of samples designed to be able to be put in series with other transport units in the same automatic unit (to boost the processing capacity of samples), optionally associated with analysers having separate maximal rates.

To respond to these needs, according to a first aspect, the invention relates to a transport unit for sample containers according to claim 1.

In the transport unit of the invention, the waiting zone constitutes a buffer for temporarily storing samples awaiting a first analysis result, such that said samples are quickly replaced in the analysis zone if secondary tests are necessary.

An interesting advantage of the invention is that the transportation route stays free when a rack is moved between a waiting zone and an analysis zone, as well as during analysis of a sample. Sorting samples for analysis is therefore independent of the transport of racks in the file.

More specifically, the platter is configured so that a rack can describe out-and-return movements between a waiting zone and an analysis zone without recrossing the transportation route.

This combines the possibility of conducting secondary tests such as Rerun or Reflex tests (a rack being temporarily put on hold in the waiting zone) and keeping a high rate.

An additional advantage is that the transport unit ne comprises pas necessarily a return route added parallel to the transportation route. In a phase where the automatic diagnosis unit rotates at full speed, the waiting zone as such retains a sufficient margin after initial tests have been conducted to allow secondary tests.

The bulk of the transport unit of the invention is therefore reduced, both in width and in length.

Besides, the transport unit of the invention is modular, as the ends of the transportation route can be connected either to other transportation routes of other transport units, or to storage spaces of racks such as spaces of an entrance bay or an exit bay.

Additional non-limiting characteristics of the transport unit defined hereinabove are the following, taken singly or in any one of possible combinations:

- the unit further comprises transport means configured to transport a rack of samples along the transportation route.
- the selection means comprise a sliding stopper, a sliding of the stopper occurring according to a second direction not parallel to the first direction, the selection means further comprising stopper displacement means.
- the platter is a rotary platter, the transport unit further comprising an actuator which controls rotation of the rotary platter, said rotation moving a rack of samples between the waiting zone and the analysis zone.
- the waiting zone and the analysis zone are symmetrical relative to an axis of rotation of the rotary platter.
- the platter comprises a transfer zone, the transfer zone further extending on the transportation route.
- the unit further comprises a separating surface passing through a centre of the platter, said surface being configured to prevent uncontrolled passage of a sample container towards the analysis zone during analysis of a sample, preferably a glass pane.
- the platter is configured to allow displacement in translation of a rack of samples according to a third direction not parallel to the first direction.
- the platter is mobile in translation according to the third direction.
- the unit comprises a first waiting zone, a transfer zone extending on the transportation route, a second waiting zone, the analysis zone, and a third waiting zone, the platter being configured to guide a rack of samples in any one of said zones.
- the waiting zone and the analysis zone have aligned ends, a direction of extension of the waiting zone and a direction of extension of the analysis zone being parallel to the first direction of the transportation route.
- the unit further comprises a stop element configured to come to stop against a rack of samples present on the transportation route.
- the transport unit is adapted to transport a rack of samples in a single direction along the transportation route, from the first end to the second end.
- a maximal width of the transport unit according to the first direction is less than or equal to twice a length of a rack.

According to a second aspect, the aim of the invention is an automatic diagnosis unit comprising a first transport unit of containers of samples such as defined hereinabove, and a first handling unit of samples, the first handling unit of samples comprising:

- a displacement module of a sample container towards a sampling position,
- a needle support module, comprising a needle configured to take a sample from the sampling position,
- a processing unit configured to control displacement of the displacement module and of the needle support module.

Additional non-limiting characteristics of the automatic unit defined hereinabove are the following, taken singly or in any one of possible combinations:

- the displacement module is configured to translate a container of samples according to a fourth direction and according to a fifth direction, the fourth direction being a direction of alignment of the analysis zone of the first transport unit.
- the automatic unit further comprises:

a second transport unit of containers of samples such as defined hereinabove, associated with a second handling unit of samples, comprising a displacement module, a needle support module and a processing unit, the second handling unit being preferably attached to the first handling unit, and/or further comprises an inlet bay comprising a first space for housing a rack of samples, and/or further comprises an outlet bay comprising a second space for housing a rack of samples, the transportation route of the first transport unit of samples extending from the transportation route of the second transport unit of samples and/or extending from the first space for housing a rack and/or extending from the second space for housing a rack.

- a first maximal processing rate of samples, which the first handling unit is configured to achieve, is separate from a second maximal processing rate of samples, which the second handling unit is configured to achieve.

GENERAL PRESENTATION OF THE DRAWINGS

Other characteristics, aims and advantages of the invention will emerge from the following description which is illustrative and non-limiting and which must be considered with the appended drawings, in which:

FIG. 4a is a plan view of the transport unit of FIG. 3, where the sliding stoppers are in a first position;

FIGS. 10a to 10g illustrate several successive positions of two racks of samples during operation of a transport unit of samples according to the mode of FIG. 3;

DETAILED DESCRIPTION OF EMBODIMENTS

Figure 1:
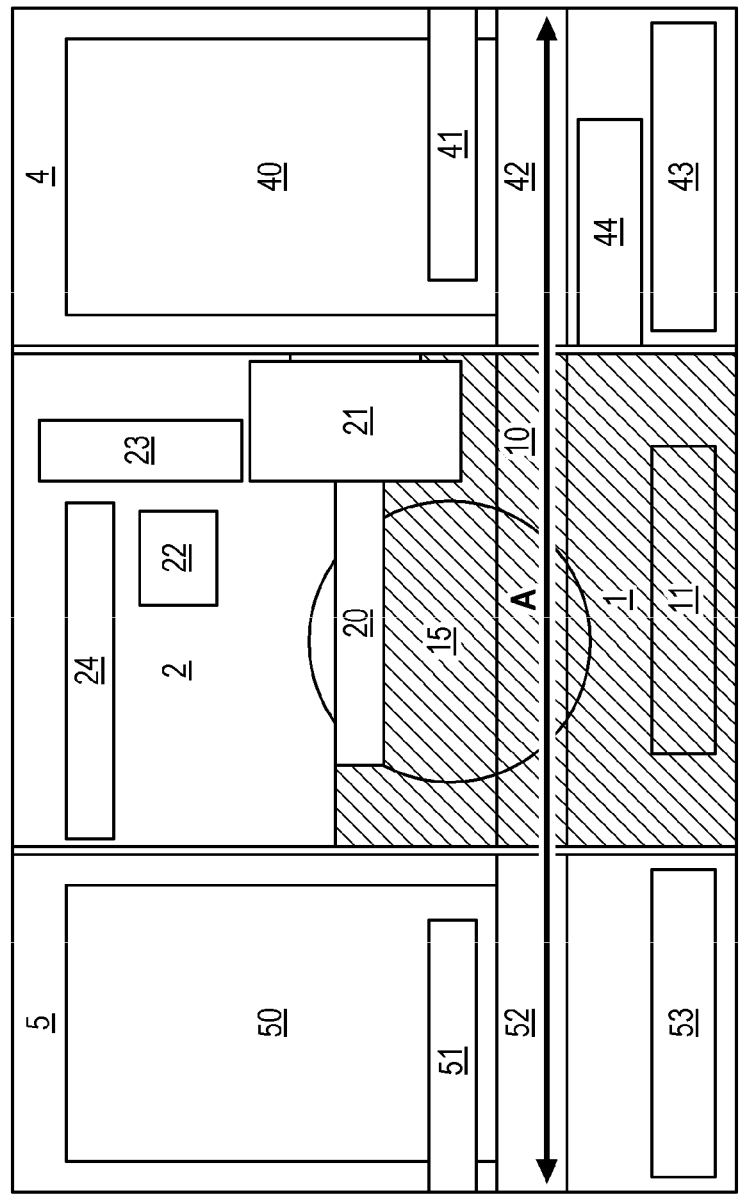
FIG. 1 illustrates a functional architecture of an automatic diagnosis unit according to an embodiment.

In the following description several examples of transport units of containers of samples are described, intended to function coupled with analysers of automatic medical diagnosis units. "Sample" means a liquid or solid volume on which the automatic diagnosis unit conducts one or more tests, and "container of samples" means any enclosure which enables individualized transport of a sample coming from of an individual.

In the following examples the containers of samples are tubes transported in racks, each rack comprising ten placements and each placement able to enclose a container. It is very clear that it is possible to use another number of placements, or another mode for transport of containers.

Similar elements are designated with the same alphanumeric reference numerals in the description and in the attached figures.

Overall Architecture of an Automatic Diagnosis Unit—Example 1

FIG. 1 illustrates a functional representation by blocks of an automatic diagnosis unit, seen from above. This automatic unit can be assembled and utilized in a laboratory of medical analysis or in a hospital, for example in diabetology or haematology.

Figure 2:
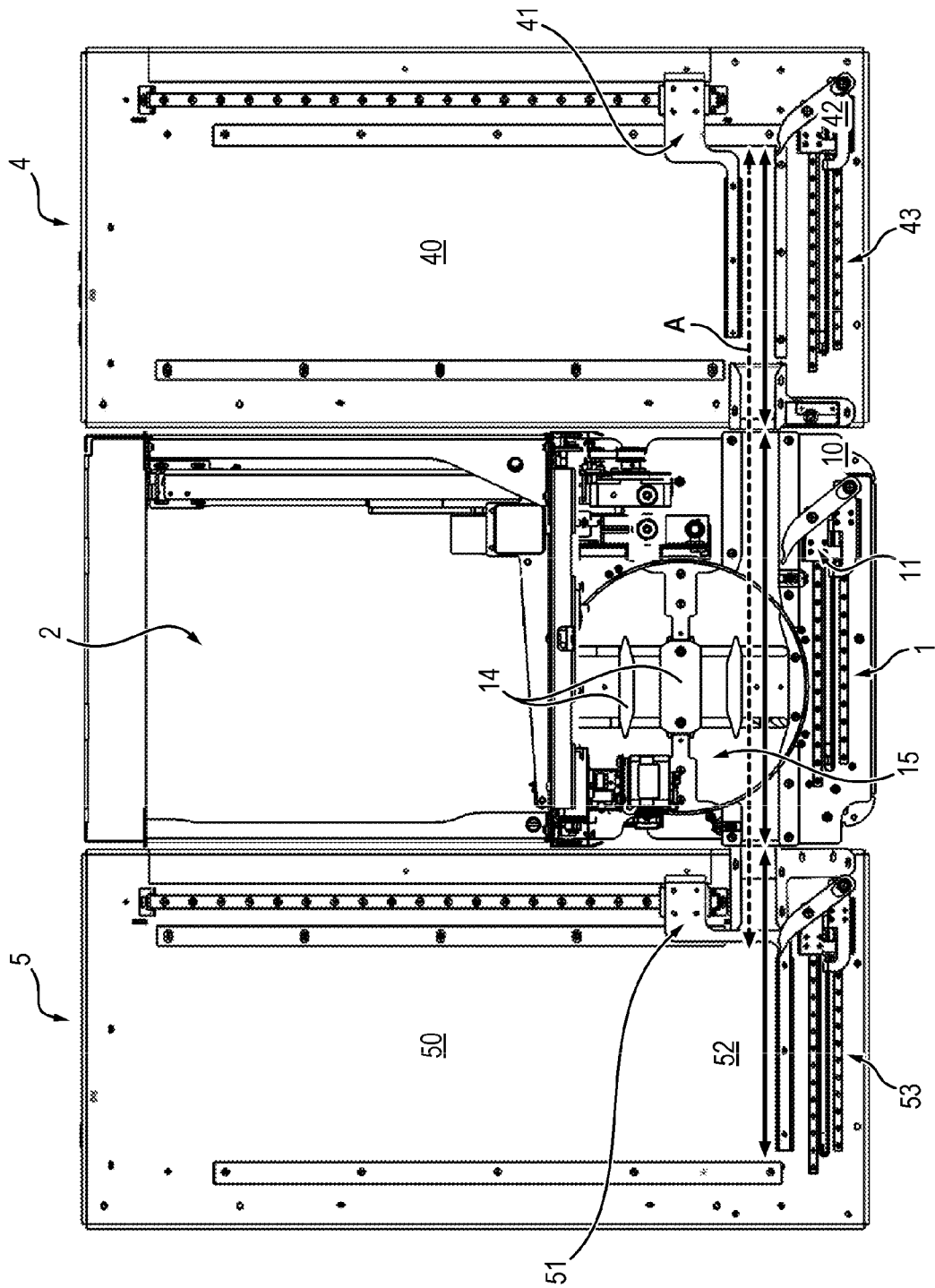
FIG. 2 is a plan overview of an automatic unit according to the embodiment of FIG. 1.

A structural diagram of the same automatic unit, also seen from above, is shown in FIG. 2.

Hereinbelow, the containers of samples are tubes. The automatic unit comprises a unit 1 for transport of tubes, a unit 2 for handling tubes for analysis, and an inlet bay 4 and an outlet bay 5.

The transport unit, the inlet bay and the outlet bay function as synchronized to ensure transport of racks of tubes according to a direction of transport A, the racks not being shown in FIGS. 1 and 2.

In a possible variant, the racks of tubes are mobile from the right towards the left only according to the orientation of FIG. 2.

The operations of the units 1 and 2 and bays 4 and 5 are controlled by one or more processors of a control unit which is not shown in FIG. 1.

The transport unit 1 comprises a transportation route 10 whereof the dimensions in length and width house at least one rack of tubes. Also, the transport unit comprises displacement means of racks of samples, for guiding samples to a position for their analysis according to modalities described hereinbelow. Here, the displacement means take the form of a mobile platter 15. More precisely, the mobile platter is circular here.

The transport unit 1 also comprises transport means for transporting racks along the transportation route 10. Hereinbelow, the transport means correspond to an attached unit 11 parallel to the transportation route, comprising a rail.

The unit 1 also comprises rack selection means 14.

The handling unit 2 is programmed to prepare samples for analysis, then to perform the analyses. In this respect, it comprises a space for storage of reactants, and a computer memory for saving and export results of analysis.

The handling unit 2 comprises a module 20 for displacement of containers of samples, a needle support module 23 comprising especially a needle for taking a sample and son insertion in a space of analysis 22, and a processing unit 24 programmed to control the displacement of the modules 20 and 23. The analyses, for example diabetological or haematological, are performed in the analysis space 22.

Advantageously, the unit 2 also comprises a module 21 for preparation and provision of samples for analysis. The structure of the handling unit 2 will be described hereinbelow.

The inlet bay 4 constitutes a space for storage of racks, each rack comprising samples to be analysed, or not.

The bay 4 comprises an inlet surface 40, whereof the dimensions house a file of racks (here aligned in length).

The inlet surface is provided to comprise a number of racks greater than 2, here 20 racks.

The bay 4 also comprises a space 42 for housing at least one rack, and which is located in the extension of the transportation route 10 of the unit 1 according to the direction of transport A. The bay 4 further comprises a tappet 41 configured to guide a rack from the surface 40 towards the space 42, the tappet 41 here being mounted on a rail.

The bay 4 comprises transport means for accompanying the movement of a rack from the space 42 towards the transportation route 10, here an attached unit 43 parallel to the space 42 and comprising a rail.

Therefore, when operating, a rack can be guided on the transportation route 10 from the inlet surface 40, via the space 42.

The bay 4 inlet further comprises a detection unit 44 of samples and racks, configured to reference identifiers of samples contained in the racks, and to detect positions of racks on the direction A.

The outlet bay 5 also constitutes a space for storage of racks. Its structure here is very similar to that of the inlet bay 4.

The bay 5 comprises an outlet surface 50 where a file of racks (here aligned in length) can be housed, as well as a tappet 51, a space 52 where a rack can be received at outlet of the transportation route 10, and an attached unit 53 comprising a rail.

An advantage of providing an inlet bay and an outlet bay is to considerably increase space for storage of racks of samples, to allow a large number of analyses to be performed.

It is to be noted that transport unit 1 is modular. Here, transport unit 1 is connected to an inlet bay and to an outlet bay, but as an alternative, it could be connected to other transport unit, according to needs.

Sample Transport Unit

Figure 3:
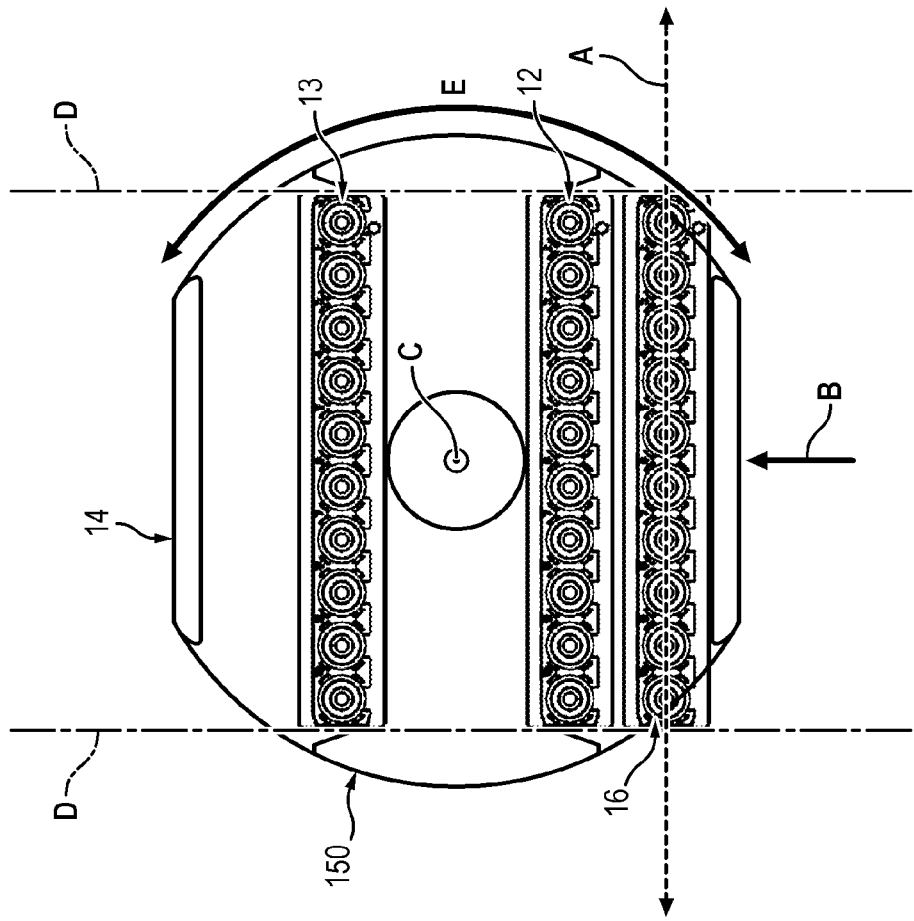
FIG. 3 is a block diagram of a transport unit of samples according to a first mode.

FIG. 3 is a partial top schematic view of a transport unit according to a first embodiment, which corresponds to the transport unit shown in FIGS. 1 and 2.

In this particular embodiment, the platter 15 is mobile. Displacement of the platter 15 causes positioning zones of racks and moves racks between a waiting zone and an analysis zone.

The platter 15 comprises a positioning surface 150 of racks, which can rotate on itself according to the direction E, relative to a frame not shown here. The frame is fixed.

The platter 15 crosses the route for transport of racks according to the direction A. Advantageously, the platter 15 comprises a transfer zone 16 at the intersection with the transportation route, the transfer zone 16 therefore extending according to the direction A.

According to the invention, the platter comprises an analysis zone 13 and a waiting zone 12 each adapted to receive a rack of samples.

It is clear that the term "zone" relates to a fixed volume relative to the frame. Therefore, the zones 12, 13 and 16 do not follow the rotary movement of the surface 150 of the platter 15, and therefore do not follow the movement of a given rack. On the contrary, the platter 15 is configured to move a rack between these different zones.

The platter 15 is therefore configured to be moved according to the direction E, to guide a rack between the waiting zone 12 and the analysis zone 13. Here it enables out-and-return movements of a rack in both directions between the waiting zone 12 and the analysis zone 13, as a function of the angular position of the rotating surface 150.

At the same time the platter 15 therefore forms a support and locomotion surface of racks comprising the samples to be analysed.

Here, the waiting zone 12 and the analysis zone 13 are symmetrical relative to an axis C of rotation of the rotary platter, the axis C passing through a centre of the platter.

Therefore, the platter 15 rotates 180° around the axis C to guide a rack located in the waiting zone as far as the analysis zone, and/or to guide a rack located in the analysis zone for guide as far as the waiting zone. An advantage of the waiting and analysis zones located at angular positions separated by 180° is a considerably reduced spatial bulk of the platter according to the direction A.

In fact, the waiting zone 12 and the analysis zone 13 have ends two by two aligned according to the directions D, as shown in FIG. 3, and have total extension according to the direction A equal to a rack width. A maximal width of the transport unit according to the direction A is preferably less than or equal to twice the length of a rack of samples. Here, said maximal width is equal to around 1.5 times the length of a rack.

In an alternative configuration (not shown in the figures), the analysis zone 13 is offset by 90° on the platter relative to the waiting zone 12. Therefore, the platter 15 turns by 90° about its own axis of rotation to guide a rack located in the waiting zone as far as the analysis zone.

In this configuration, the position of the waiting zone can for example be the same as in FIG. 3, and the analysis zone then extends perpendicularly to the waiting zone, on the side left of the platter. A platter according to this latter case can especially be used in combination with a handling unit of samples comprising a needle support module capable of moving perpendicularly to the direction A. Such a needle support module lets the needle pierce and take a sample directly in the ten positions of tubes in the rack.

It is evident that in all the configurations hereinabove, a fixed platter can be provided as an alternative instead of a mobile platter, the movement of which moves a rack between the waiting zone and the analysis zone. Additional means controllable electronically are added to the platter to allow displacement of racks on the fixed surface of the platter, between the waiting zone and the analysis zone.

By way of example, the selection means 14 can be configured to execute not only sliding of racks between the transfer zone and the waiting zone, but also between the waiting zone and the analysis zone.

For all platters described hereinabove, the waiting zone 12 and the analysis zone 13 are offset from the transportation route extending according to the direction A (zones 12 and 13 being especially separate from the transfer zone 16).

A major advantage of this positioning of waiting and analysis zones is that racks can circulate from right to left by passing through the transfer zone 16, without blocking the transportation route during displacement of racks between the waiting zone 12 and the analysis zone 13.

The transport of samples is dissociated highly advantageously according to the direction A and sorting samples prior to their analysis for first tests and/or secondary tests following the result of the first tests.

Assuming that a second transport unit similar to the unit 1 is inserted in between the unit 1 and the outlet bay 5 of FIGS. 1 and 2, it is now possible to directly convey a rack between the inlet bay 4 and said second unit, without stopping on the unit 1.

Also, conveying said rack to the second unit does not reduce the rate of analysis for the samples during analysis located on the platter 15 of the unit 1.

The waiting zone 12 absorbs the time for determining whether a sample needs secondary tests, or not. Samples can stay on hold in the waiting zone 12, without disrupting the transport of other racks via the transportation route 10. As they wait, the samples are not replaced without the transportation route 10 and therefore do not block the transport of other racks.

The selection transport unit 1 further comprises means 14 for selection of racks, which are configured to move a rack between the transportation route 10 and the waiting zone 12.

FIG. 3 shows a direction B of displacement of racks by the selection means, between the transfer zone 16 and the waiting zone 12.

In this first embodiment of the transport unit, the displacement direction B of racks from the transportation route is perpendicular to the transport direction A of racks. Therefore, the selection means 14 are configured to vertically offset a rack from the transportation route, which guides a rack on the waiting zone to extract it from the transportation route. The means 14 also return a rack present on the waiting zone 12 on the transportation route.

In the first position shown in FIG. 3, the selection means 14 are located at the ends of the platter 15.

An example of operation of the platter 15 and the selection means 14, during a sequence of analysis of samples contained in a rack, will be given hereinbelow in to FIGS. 10A to 10G.

Figure 4B:
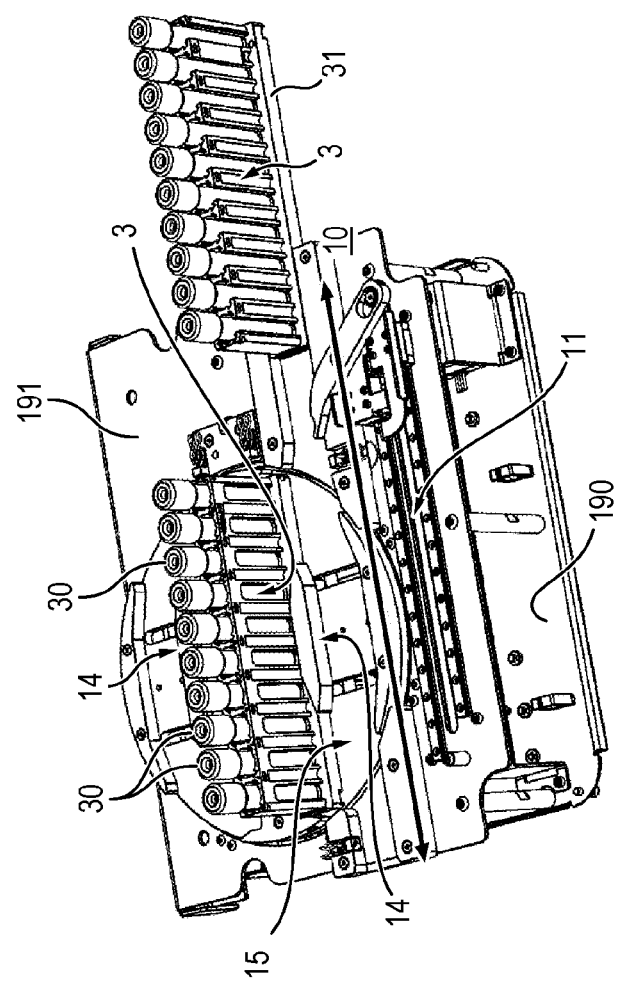
FIG. 4b is a side elevation of the transport unit of FIG. 3, where the sliding stoppers are in a second position.

FIG. 4a is a close-up plan view of the transport unit 1 of FIGS. 1 and 2. FIG. 4b is a side elevation of the same transport unit on which two racks 3 are placed, one of the racks being already present in the waiting zone and the other rack in the process of being inserted on the transportation route 10 of the unit 1.

FIG. 4b shows a low surface 190 of the transport unit 1, which can rest on a table for example, and a high surface 191 located at the same level as the transportation route and the rotary platter. The surfaces 190 and 191 belong to a frame.

Each rack 3 comprises a support 31, for example made of polymer, of overall rectangular form. A partition of the support separates the samples of each pair of two consecutive samples. In FIG. 4b, each placement is occupied by a tube 30. The tubes 30 comprise samples of body fluid such as blood, and are closed by a stopper which can be pierced by a needle of an analyser. As an alternative, some placements could be empty.

The transportation route 10 extends according to the direction of transport A between a first left end 101 and a second right end 102. The space 42 of inlet bay 4 (not shown here) is in the extension of the right end 102 and the space 52 of outlet bay 5 (not shown here) is in the extension of the left end 101.

Thus, right end 102 is adapted to receive a rack of samples from a device, for example from inlet bay 4 (at the level of space 42) and is adapted to transmit a rack of samples to another device, for example outlet bay 5 (at the level of space 52).

The rotary platter 15 optionally comprises, apart from the wait, analysis and transfer zones, a separating surface 17 passing through a centre of the rotary platter, preventing uncontrolled passage of a tube towards the analysis zone 13, especially during analysis of a sample. This surface 17 extends preferably in height from a diameter of the rotary platter. If the platter is rotary, the separating surface is solid with the movement of rotation of the rotary platter.

Here, the surface 17 is a glass pane. Advantageously, a rounded end of the surface 17 can be provided, configured to surmount the top of the tubes of a rack located in the waiting zone.

Also, the transport unit 1 optionally comprises:
A sensor 180 for detecting if a rack is present in the analysis zone;
A sensor 181 for detecting if a rack is present in the waiting zone;
A sensor 182 for detecting if a rack is present in the transfer zone;
A sensor 183 for detecting if a rack is present in the transportation route, for example for detecting if a rack is I the process of transferring towards the route 52 of the outlet bay 5 or towards another transport unit 1.

The transport means of a rack on the transportation route 10 comprise a finger 110, a fixed piece 111 and a rail 112.

The finger 110 has a folded-back position in which it is aligned with the fixed piece 111 and a deployed position in which an end of the finger 110 extends towards the transportation route 10. In the deployed position the end of the finger 110 can come to stop against a rack located on the transportation route 3, to block this rack.

The position of the finger along the rail is selected so that a rack stopped by the finger extends on the transfer zone 16, ready to be moved by the selection means 14 on the waiting zone 12.

The rail 112 extends along the transportation route 10 according to a direction parallel to the direction A, to guider displacement of one or more racks along the transportation route 10.

An advantage of the finger 110 is not blocking rotation of the platter 15. Therefore, the finger does not interfere with any out-and-return movements of racks between the waiting zone and the analysis zone.

Figure 5A:
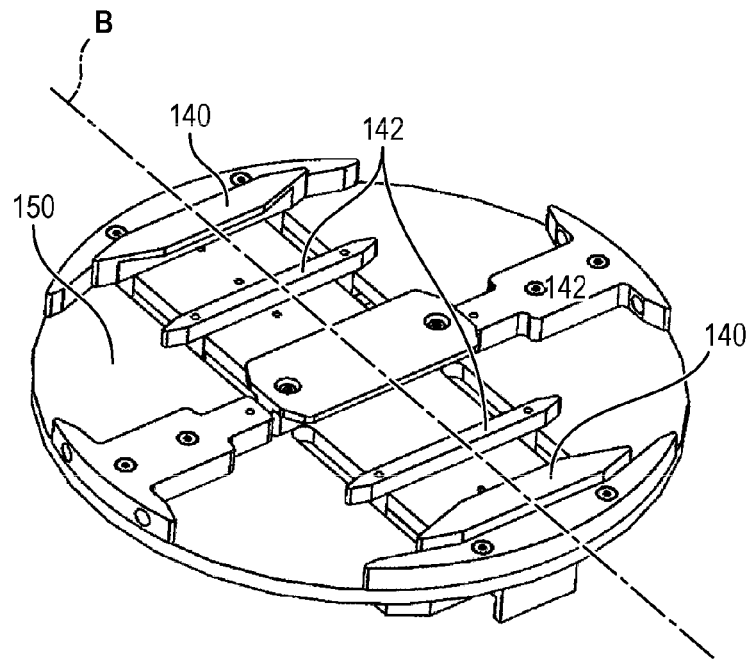
FIGS. 5a and 5b are respectively top and bottom perspective views of a first part of the displacement module and of the selection module seen in FIG. 3.
Figure 5B:
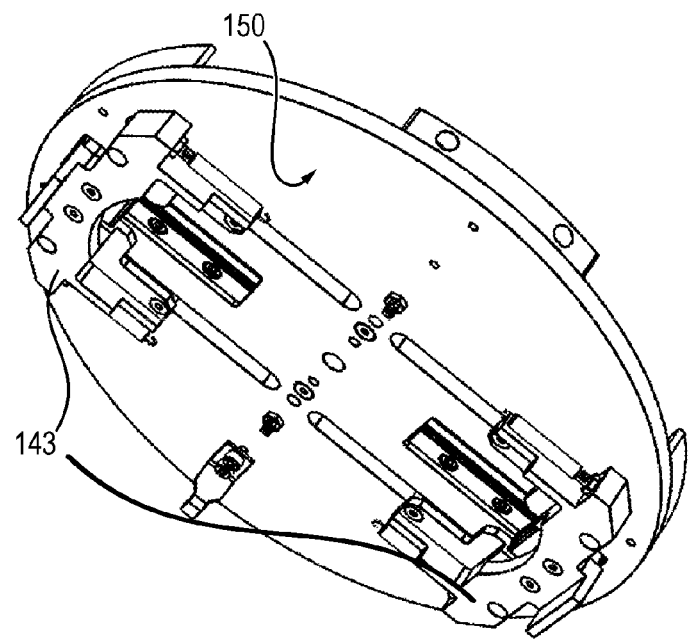
Figure 6A:
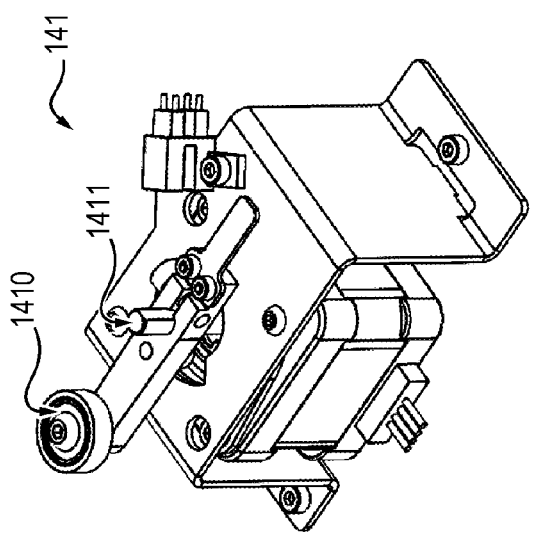
FIGS. 6a, 6b and 6c are respectively top perspective views, bottom views in a first position, and bottom views in a second position, for a second part of the displacement module and of the selection module seen in FIG. 3.
Figure 6C:
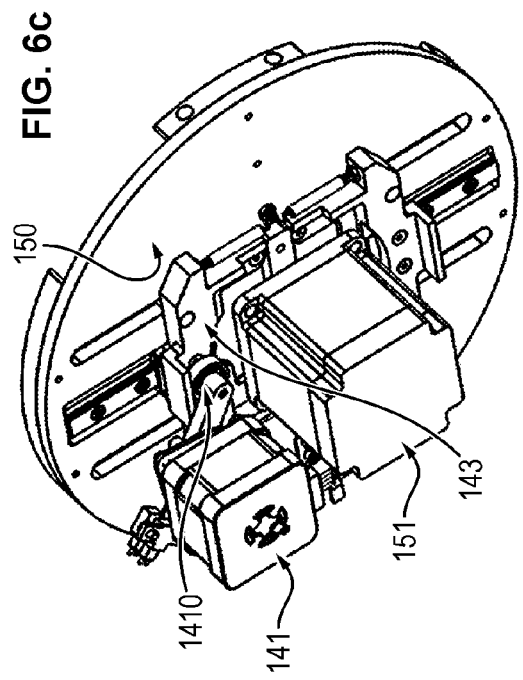
Figure 6B:
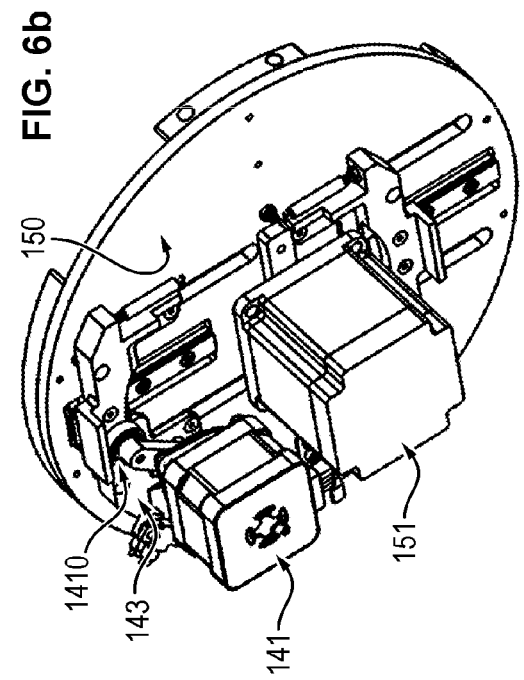

FIGS. 5a and 5b are top and bottom plan views respectively of the rotary platter of the transport unit of FIG. 2. FIG. 6a illustrates the actuator 141 associated with the selection means 14, where the face positioned against the base of the platter 15 is viewed from above. FIGS. 6b and 6c are bottom plan views of the platter, the actuators 141 and 151 associated respectively with the selection means 14 and with rotation of the platter 15 being mounted on the platter.

In this example, the selection means, for transferring racks between the transfer zone and the waiting zone, comprise two elements mobile in translation according to the direction B, mounted facing each other on a diameter of the platter.

Each one of these elements comprises an external stopper 140 and an internal stopper 142 on the upper face of the platter, the external stopper being solid with the internal stopper. Therefore, the external stopper and the internal stopper remain parallel and between them retain the same gap.

The stoppers are solid with a piece 143 which exceeds the bottom face of the platter and which is seen in FIGS. 6a, 6b and 6c.

The piece 143 is coupled to the actuator 141. By moving the piece 143, the actuator can also move an external stopper and the associated internal stopper in translation according to the direction B.

To allow this displacement, the piece 143 comprises here a female element which can engage with a male element 1410 movable by the actuator. The male element 1410 is mounted at a free end of a lever, the other end being mounted on a shaft 1411 set in rotation by the actuator.

As seen in FIGS. 6b and 6c, the actuator 141 is arranged on the side of the displacement path of the stoppers 140 and 142, such that rotation of the lever bearing the male element 1410 causes displacement in translation of the stoppers. The actuator 141 can be controlled electronically.

FIGS. 6b and 6c illustrate respectively a high position and a low position of the selection means.

The actuator 151 is positioned on the bottom of the platter 15, opposite the centre of the platter, and is controllable electronically to adjust the angular position of the platter, accordingly describing the movement E.

In the alternative configuration where the platter is not rotary, a platter as per FIGS. 5a to 6c can be used, without an actuator configured to modify the angular position of the platter.

Figure 7:
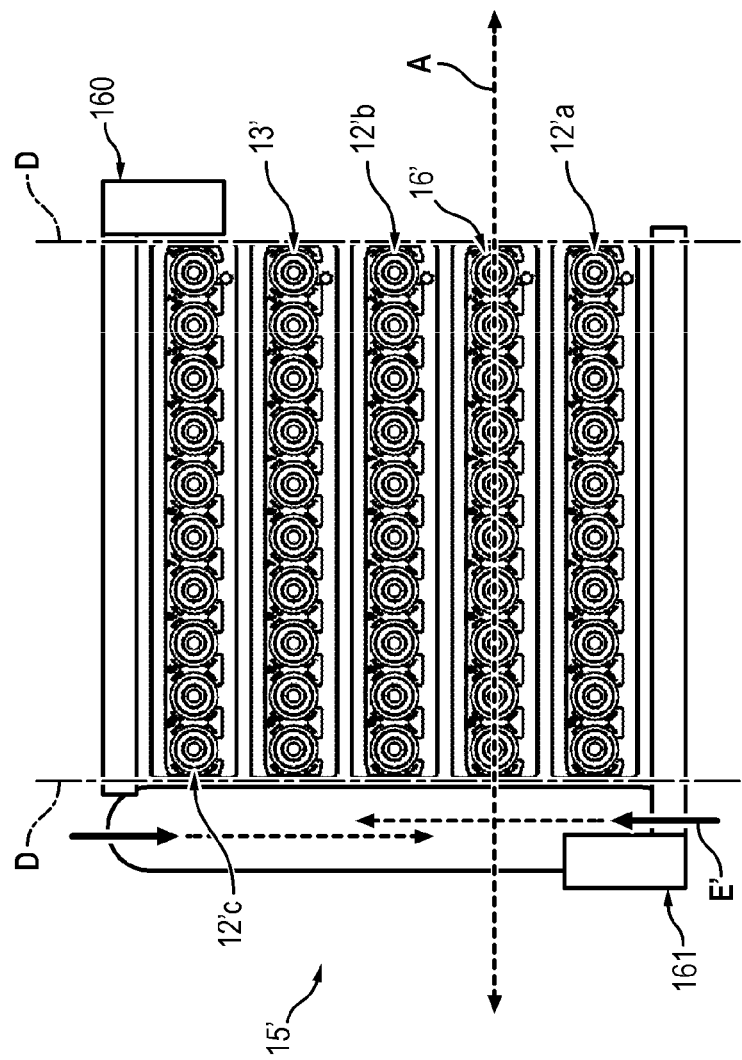
FIG. 7 is a block diagram of a transport unit of samples according to a second mode.

FIG. 7 schematically illustrates a mobile part of a transport unit of samples according to an alternative embodiment relative to the embodiment of FIG. 3.

In this embodiment, the platter is not mobile. The racks of samples are drawn along between several zones by the displacement of internal 160 and external 161 tappets. The internal rack here comprises an arm extending through the platter, in its course configured to take away a rack which would be located on the platter. In this example, the arm extends substantially parallel to the direction of the transportation route. The external rack comprises a similar arm.

The racks of samples are displaced in translation by said tappets according to a third direction E' which is not parallel to the transport direction A of racks of samples. In this mode, the platter 15' is not mobile in rotation. The tappets are associated with an actuator (not shown) controllable electronically. The tappets are fitted with a stop system which moves each of the tappets according to the direction E' underneath.

Along with the first mode, the transportation route according to the direction A crosses the platter 15' in the region of a transfer zone 16'.

The platter 15' comprises waiting and analysis zones which are offset relative to the transfer zone 16'. In particular, the waiting and analysis zones extend parallel to the direction A and the ends of said zones are aligned, to limit the bulk.

In the example of FIG. 7, the platter 15' comprises in order from bottom to top: a first waiting zone 12'$a$, the transfer zone 16', a second waiting zone 12'$b$, an analysis zone 13', a third waiting zone 12'$c$. All these zones have sufficient dimensions to be able to house a rack of ten tubes.

In operation, if a rack arrives at the platter 15' from the transportation route and is in the transfer zone 16', said rack can be drawn along by tappets to be moved in one of the waiting zones or the analysis zone. Vice versa, a rack can be moved from the analysis zone towards a waiting zone or towards the transfer zone. The tappets also move a tappet from the transportation route towards one of the waiting zones or towards the analysis zone.

An example of displacement sequence of racks of samples according to this alternative embodiment is described hereinbelow in relation to FIGS. 11$a$ to 11$i$.

An advantage of this embodiment with tappets is its low bulk according to the direction perpendicular to the direction of the transportation route, since the total number of zones the rack can occupy is equal to five.

In an alternative configuration (not shown), the platter is mobile in translation according to the direction E'. The system no longer necessarily comprises tappets configured to move racks between the waiting zone and the analysis zone.

In this alternative configuration, the platter has for example a width corresponding to four times the width of a rack. The total number of zones a rack can occupy (as a function of the position of the mobile platter) is for example equal to sept.

An example of displacement sequence of racks of samples, according to this alternative configuration of the embodiment corresponding to displacement in translation of racks, is described hereinbelow in relation to FIGS. 12$a$ to 12$h$. The platter 15' according to any one of these configurations can be used in combination with the other elements of the transport unit described hereinabove, as replacement of the rotary platter 15 of the first mode.

Unit for Handling Samples for Analysis

Figure 8:
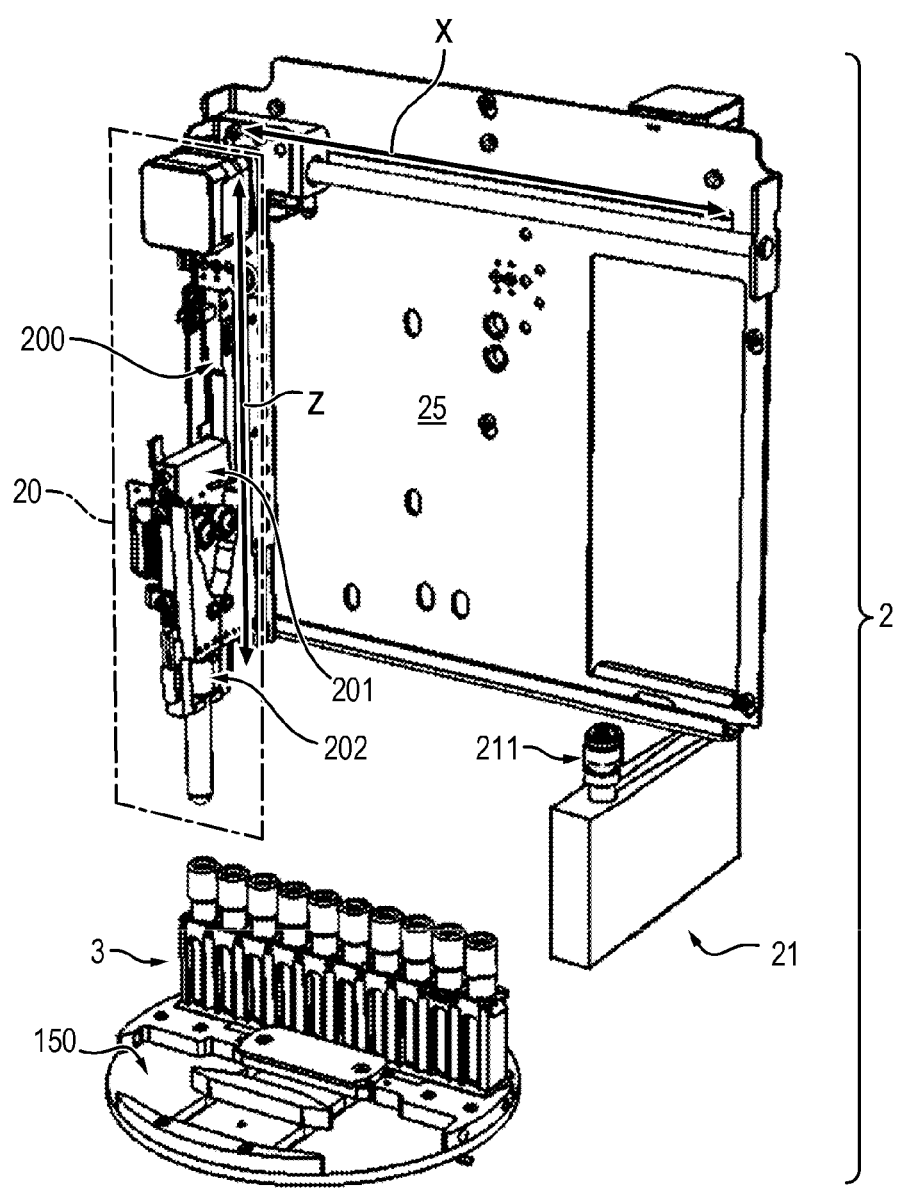
FIG. 8 is a perspective view of a first part of a handling unit and of analysis of samples, associated with a part of the transport unit according to the mode of FIG. 3.

FIG. 8 shows a part of a transport unit of samples comprising a rotary surface 150 according to FIG. 3, on which is placed a rack 3 of samples located in the analysis zone, opposite a unit 2 for handling samples.

It is clear that the handling unit of samples described hereinbelow can also be used with a platter according to any one of the other configurations described hereinabove.

The particular functions of the handling unit 2 are to carry out handling one by one of tubes towards an analysis route, and once a tube is placed on the analysis route, to take the sample contained in said tube and conduct the planned tests.

FIG. 8 shows a front panel of the unit 2.

The front panel comprises a surface 25 on which a displacement module 20 of a sample container is fixed towards a sampling position 211 (the latter position constituting a sample analysis route).

The module 20 comprises a rail 200 extending according to a direction Z. When the automatic diagnosis unit is operating, the direction Z is substantially vertical. The module 20 further comprises a block 201 controllable to move along the rail 200.

A clamp 202 is arranged on the block 201. This clamp is configured to grip a tube containing a sample and guide it on the sampling position 211.

The clamp 202 is therefore movable according to the direction Z.

The module 20 is also movable in translation according to a direction X, the clamp therefore also being movable according to the direction X.

Preferably, the direction X corresponds to a direction of alignment of the analysis zone of the transport unit of samples, in which the rack 3 extends in the view of FIG. 8.

When operating, the clamp 202 can be lowered according to the direction Z and move according to the direction X to grip any one of the tubes of the rack, then guide it on the analysis route.

The handling unit 2 further comprises a module 21 for preparation and provision of samples for analysis.

In this example, the module 21 comprises the sampling position 211, with placement for placing a tube.

Figure 9:
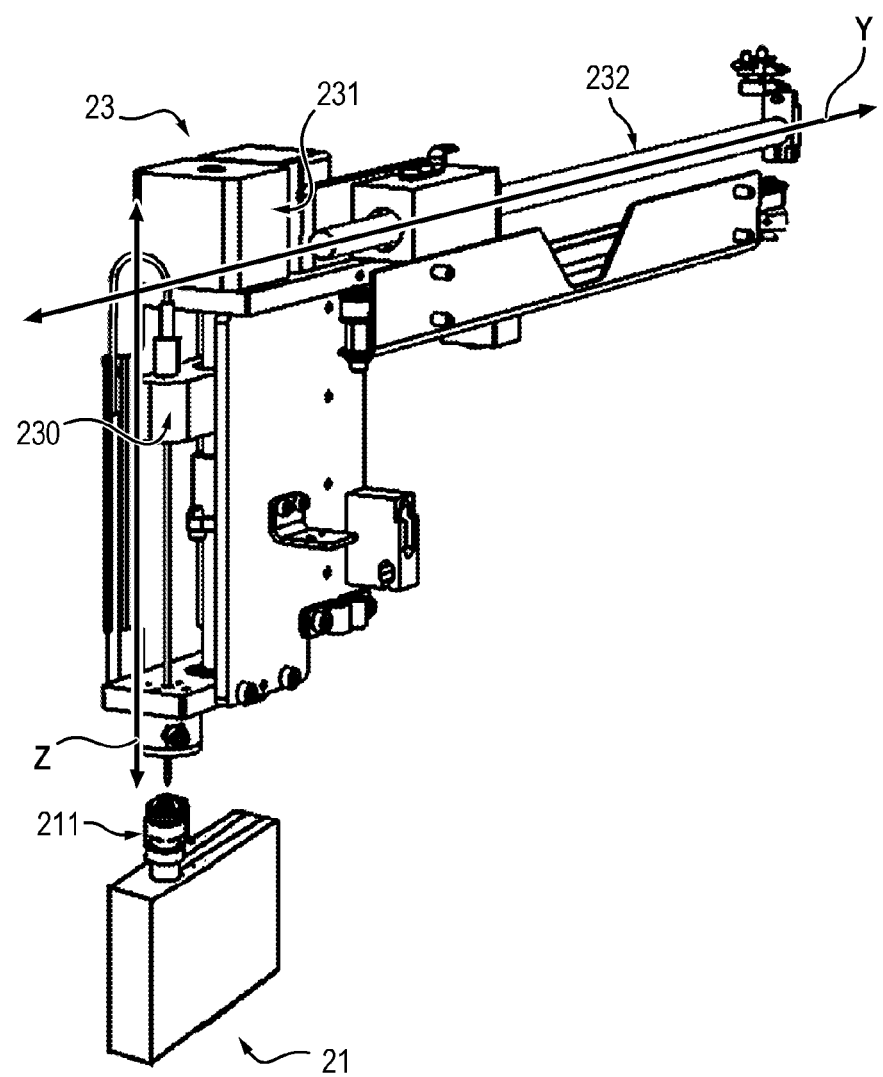
FIG. 9 is a perspective view of a second part of the handling unit and of analysis of samples of FIG. 8.

FIG. 9 illustrates a second part of the unit 2 for handling samples.

A needle support module 23 is shown in FIG. 9. The module 23 comprises a needle 230 configured to take a sample from position 211.

The needle is solid with a block 231 of the module 23, which is movable along a path 232 according to a direction Y.

The needle can further move, here according to the direction Z, to take a sample from the position 211 once it is placed vertically to the tube containing this sample. The direction Y is here perpendicular to the direction Z.

The unit 2 further comprises the processing unit 24, not shown in FIGS. 8 and 9, configured to control displacement of the modules 20 and 23 and for synchronizing the sampling operations and analysis of samples. Preferably, the unit 2 is configured to carry out identification, agitation and analysis of samples. The agitation time for any type of blood sample is preferably greater than 10 seconds for each sample. A full speed rate of the unit 2 is between 80 and 150 samples per hour. This rate is for example equal to 100 samples per hour, the processing time for analysis of a sample (once a permanent speed is installed) being 36 seconds.

The time period (for example the duration in minutes of a test) is generally equal to the duration of the reference unit period (1 h) divided by the number of samples processed in the period, multiplied by the duration of the new reference unit (for example 60 seconds).

| Tests/hour | Processing time of a sample |
| --- | --- |
| 80 | 45 seconds |
| 90 | 40 seconds |
| 100 | 36 seconds |
| 120 | 30 seconds |
| 150 | 24 seconds |

Example of Operation of the Sample Transport Unit

An operation sequence of the transport unit 1 of samples according to the embodiment of FIG. 3, in the event where the platter is rotary, is illustrated in chronological order in FIGS. 10a to 10g. The sequence extends from the entry of a rack 3a on the platter (during analysis of samples of another rack 3b) to the outlet of the rack 3b.

Figure 10A:
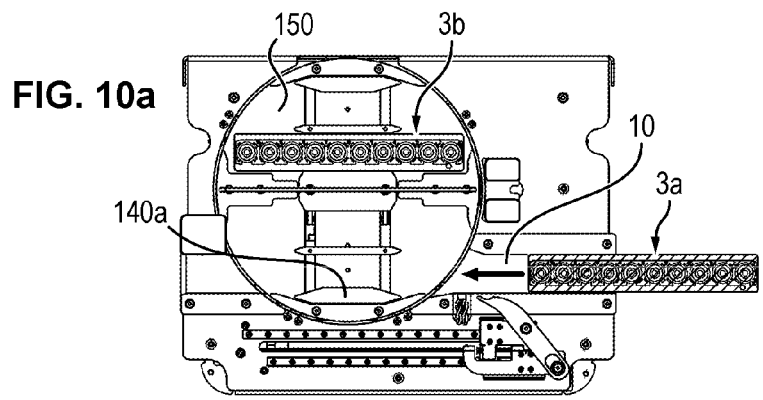

In FIG. 10a, the rack 3b is located in the analysis zone 13. Therefore, the displacement module of tubes can select tubes of the rack 3b for analysis.

Independently of the analysis of tubes of the rack 3b, the new rack 3a is moved along the transportation route 10 (for example, from an inlet bay) to be inserted.

The external stopper 140a of the selection means is in a low position.

Figure 10B:
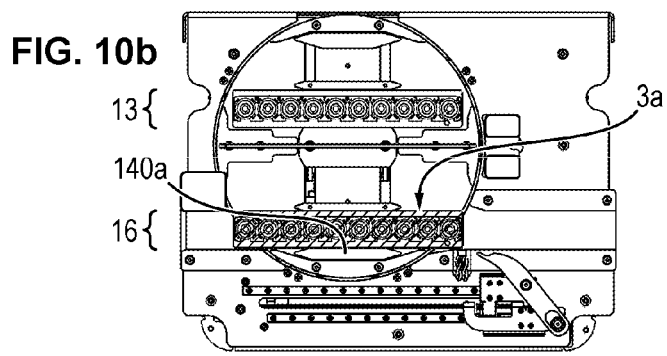

In FIG. 10b, the rack 3a reaches the transfer zone 16. The rack 3a is now positioned on the rotary surface 150 of the platter. At the same time, analysis of the tubes of the rack 3b can be continued.

Figure 10C:
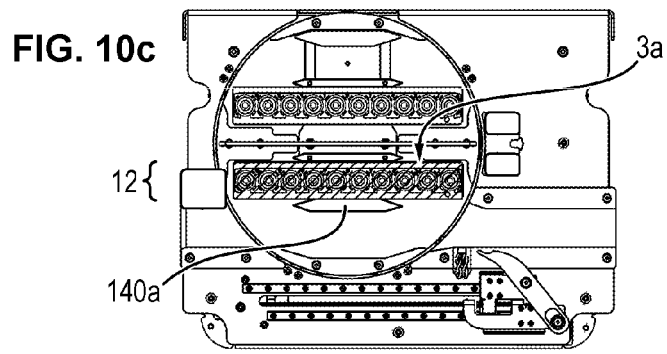

In FIG. 10c, the selection means are set in motion; in this way an external stopper 140a is moved from its low position towards its high position. This displacement draws the rack 3a along from the transfer zone 16 towards the waiting zone 12. At the same time, analysis of the tubes of the rack 3b can be continued.

Figure 10D:
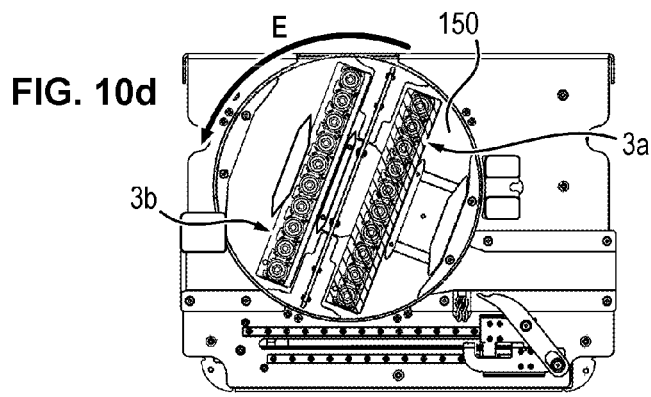

Once the rack 3a is placed in the waiting zone, the rotary platter can be set in motion, as seen in FIG. 10d. The rotary platter pivots on itself until it completes a rotation of 180°.

On completion of rotation by 180°, the rack 3a is guided into the analysis zone 13 and the rack 3b is guided into the waiting zone 12, as seen in FIG. 10e. Therefore, the samples of the rack 3b can be kept on hold while the analyser processes the test results of samples of the rack 3b. While waiting, the samples of the rack 3a can be analysed.

In FIG. 10f, the rack 3a is sent back on the transportation route of the unit 1. For this to happen, an internal stopper 142b (located opposite the stopper 140a) is moved from a high position towards a low position. This displacement draws the rack 3a from the waiting zone 12 towards the transfer zone 16 located on the transportation route.

In FIG. 10g, the rack 3b is drawn by the transport means 11 to be displaced along the transportation route 10 (for example, towards an outlet bay or towards another transport unit). The rack 3b is therefore extracted from the rotary platter.

As an alternative, instead of pulling out the rack 3b after analysis of samples, the platter 15 can again describe a rotation of 180°, the effect of which would be to guide the rack 3b back to the analysis zone. The system can be parameterized to complete this second rotation if, of the samples of the rack 3b, one or more samples need secondary tests of Rerun or Reflex type, and must therefore be sent back to the analysis route.

Furthermore, it is clear that during the steps where the transportation route 10 is disengaged (FIGS. 10c to 10e), a third rack of samples can be conveyed along the transportation route and pass through the transport unit 1, without the corresponding samples forming the object of analysis.

This latter case especially has an interest in the case of a high rate and in avoiding interruption between two racks. This second pass will be made to manage coverage between the last tube of the first rack and the first tube of the second rack. This operation can also be used in the case where the third rack is empty, or if the samples of the third rack must not be tested by the analyser linked to the transport unit 1.

An operating sequence of the transport unit 1 of samples according to the embodiment of FIG. 7, in the event where the platter comprises internal and external tappets for moving a rack on a zone among a total of five zones, is illustrated in chronological order in FIGS. 11a to 11i. The sequence extends from the entry of a rack 3a on the platter (during analysis of samples of another rack 3b) to analysis of samples of the rack 3a.

Figure 11A:
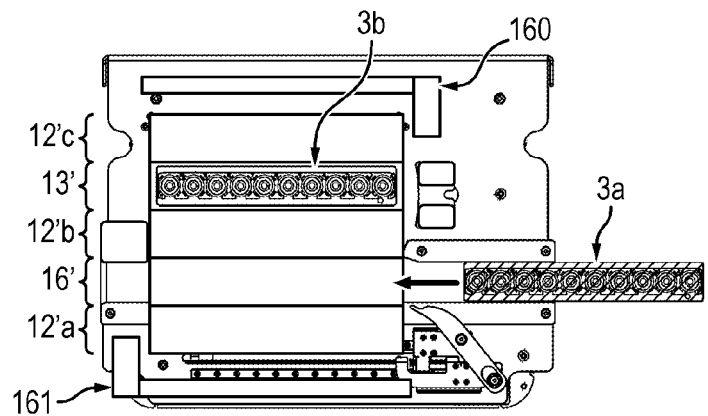
FIGS. 11a to 11i illustrate several successive positions of several racks of samples during operation of a transport unit of samples according to the mode of FIG. 7.
Figure 11B:
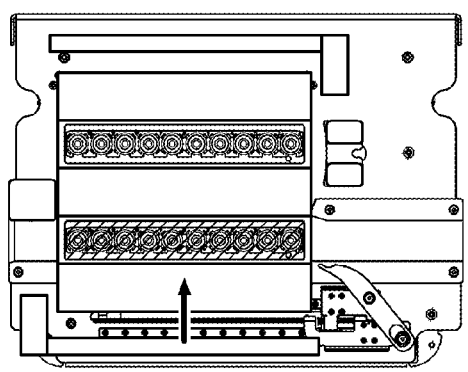
Figure 11C:
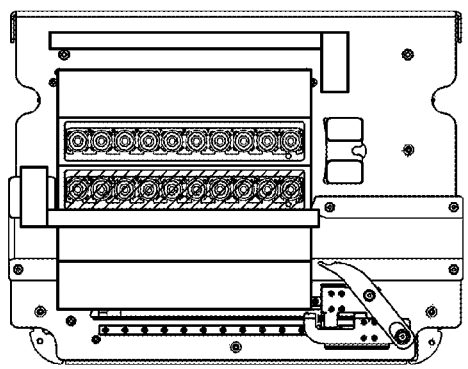
Figure 11D:
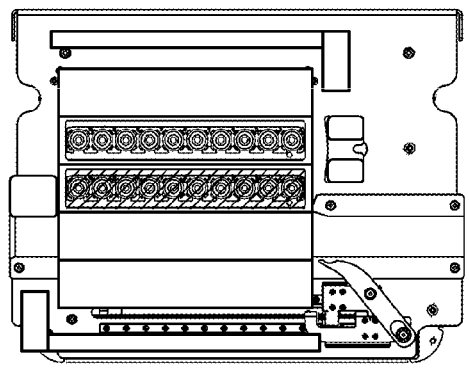
Figure 11E:
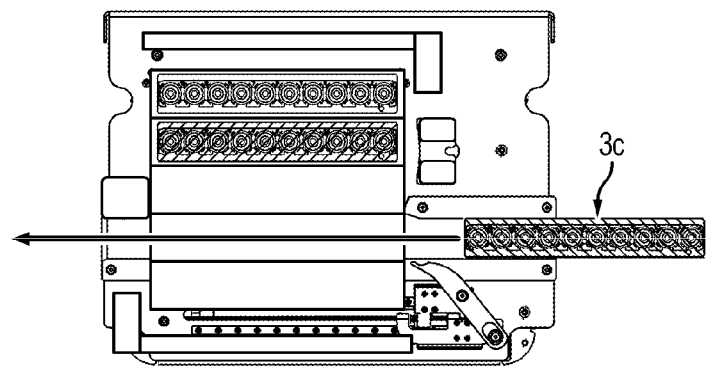
Figure 11F:
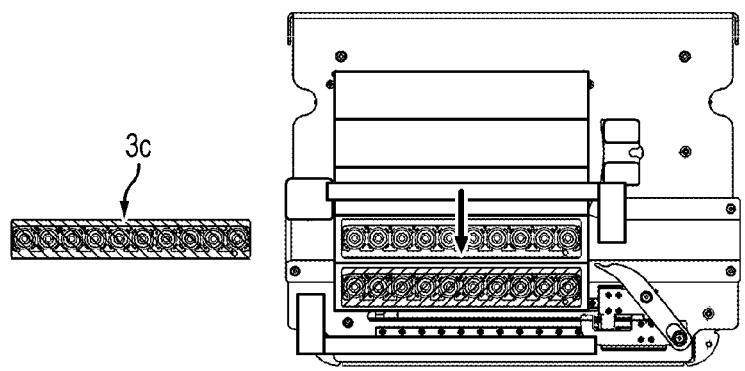
Figure 11G:
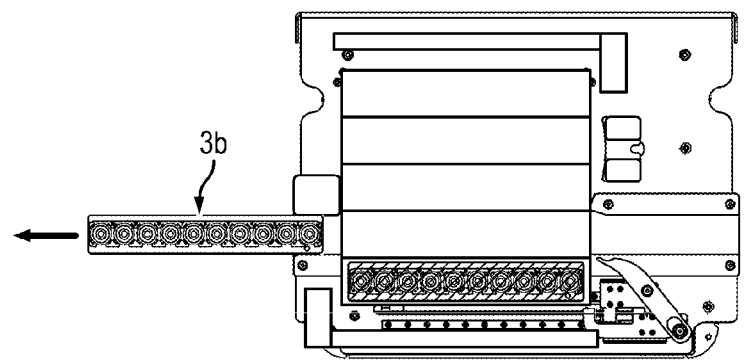
Figure 11H:
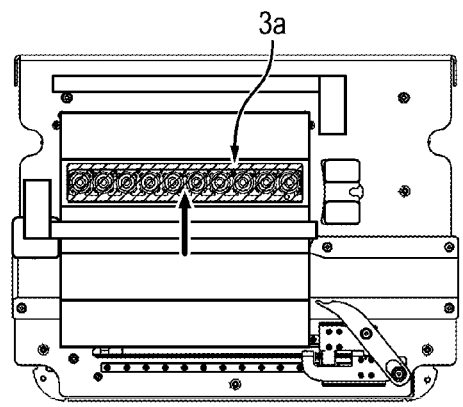
Figure 11I:
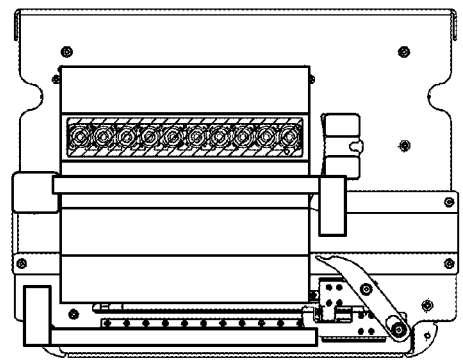

In the state shown in FIG. 11e, it is noted that a third rack 3c re-enters via the right on the transport unit of samples. In FIG. 11f, said rack 3c is removed via the left. The movement of racks 3a and 3b between waiting and analysis zones is not disrupted by the passage of the rack 3c on the transportation route.

An operating sequence of the transport unit 1 of samples according to the embodiment of FIG. 7, in the event where the platter is mobile in translation according to a direction perpendicular to the direction of the transportation route and comprises no internal and external tappets, is illustrated in chronological order in FIGS. 12a to 12h. The sequence extends from displacement of a rack 3b towards an analysis zone, and from the entry of a rack 3a on the platter to the outlet of the rack 3b.

Figure 12A:
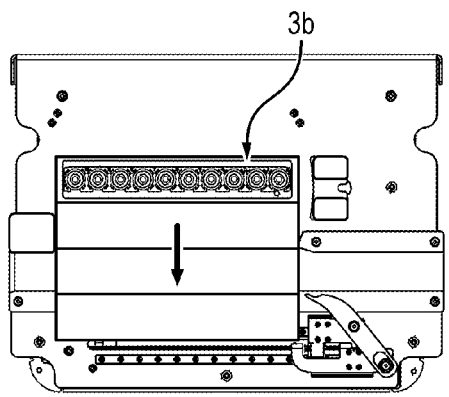
FIGS. 12a to 12h illustrate several successive positions of several racks of samples during operation of a transport unit of samples according to an alternative mode.
Figure 12B:
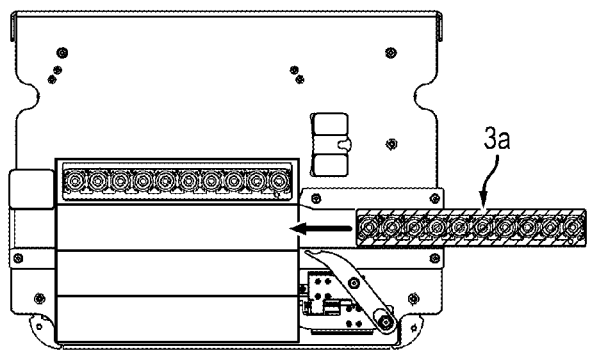
Figure 12C:
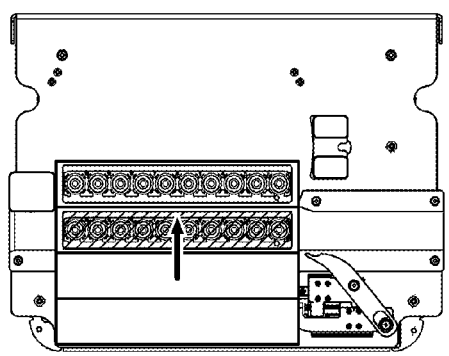
Figure 12D:
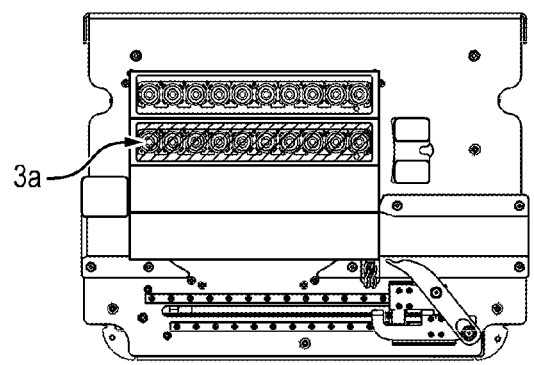
Figure 12E:
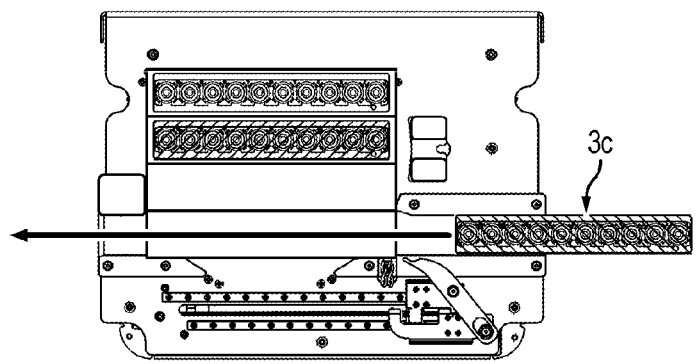
Figure 12F:
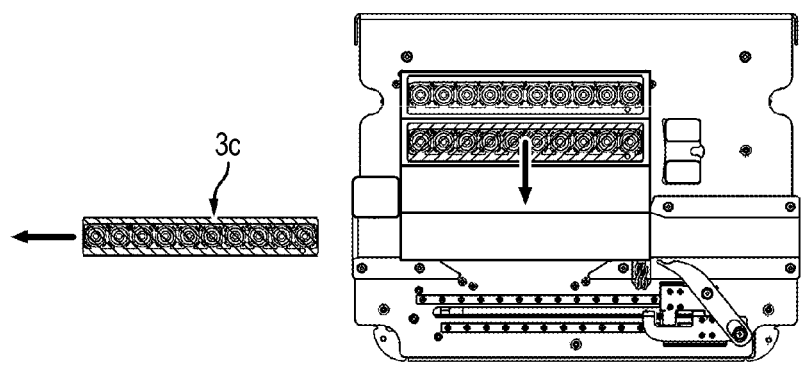
Figure 12G:
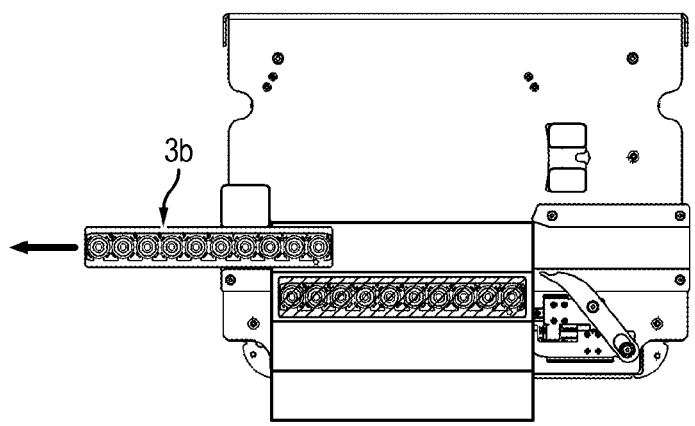
Figure 12H:
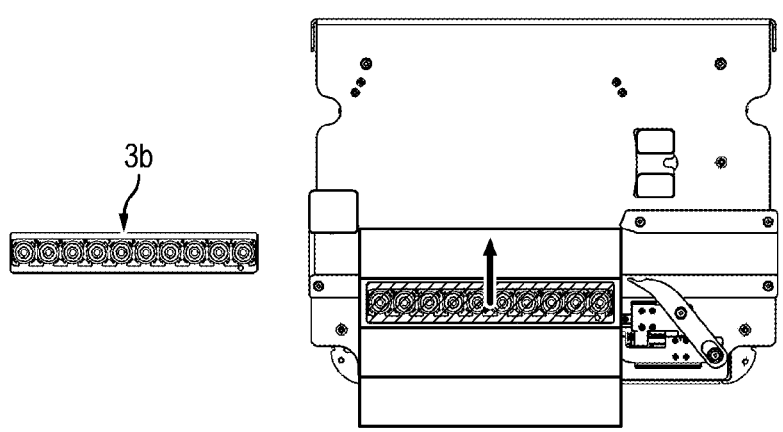

In the state shown in FIG. 12e, it is noted that a third rack 3c re-enters via the right on the transport unit of samples. In FIG. 12f, said rack 3c is removed via the left; the same applies for FIGS. a to 11i, the transit of the rack 3c not disrupting the movement of racks 3a and 3b.

Overall Architecture of an Automatic Diagnosis Unit—Example 2

Figure 13:
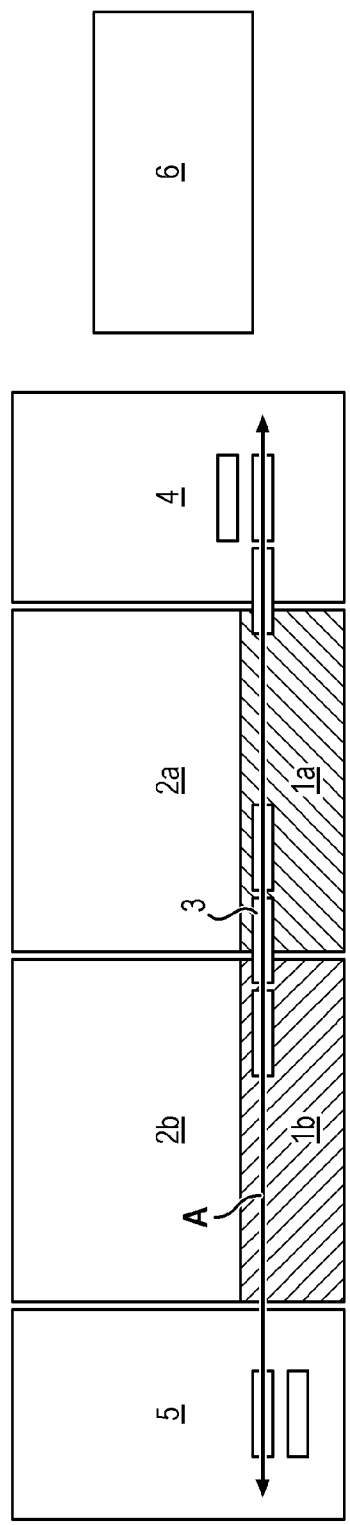
FIG. 13 illustrates architecture having two consecutive transport units of samples.

FIG. 13 is a functional representation by blocks of an automatic diagnosis unit according to an alternative mode, seen from above.

Unlike the automatic unit of FIG. 1, this automatic unit comprises two aligned analysers.

The transport unit 1a corresponding to the first analyser 2a and the transport unit 1b corresponding to the second analyser 2b are arranged such that racks 3 can be transported from the inlet bay 4 to the outlet bay 5 according to the same direction A, passing through the transportation routes of the two transport units.

All units are controlled by a control unit 6.

The transport units 1a and 1b can be in accordance with any one of the examples of structure described in relation to FIG. 3 or FIG. 7.

Advantageously, the platter of the first transport unit of samples is free to move relative to the platter of the second transport unit of samples. But the two units synchronize for what relates to the transport of racks of samples along the transport direction A.

The transport unit described hereinabove, wherein the transport of racks along the transportation route is dissociated from displacement of racks between a waiting zone and an analysis zone, is particularly advantageous if the analysers of the units 2a and 2b do not have the same maximal rate of analysis.

In fact, it is possible to use the two units 2a and 2b at their maximal rate, and the samples which do not need a test by the unit of lowest rate can pass through said unit without blocking analyses of the other samples.

Therefore, the unit of low rate does not impose its rhythm on the unit of high rate.

The result is a better overall processing rate of samples, opening up the possibility of placing in series analysers of different rates, optionally intended for different types of tests, or even different medical specialisations.

In the case of Reflex tests conducted on a system of lower rate, the systems are preferably connected in the order of lowest to highest level of expertise, in the direction of transport of the racks.

The invention claimed is:

1. A transport unit for sample containers which enclose samples to be analysed by an automatic diagnosis unit, the unit comprising:
    a transportation route of racks of samples, said route extending according to a first direction (A), said route comprising a first end adapted to receive a rack of samples from a first rack handling device and comprising a second end adapted to transmit a rack of samples to a second rack handling device;
    a mobile platter comprising a positioning surface extending in a plane;
    an analysis zone arranged inside the positioning surface, and a waiting zone arranged inside the positioning surface, the analysis zone and the waiting zone being both adapted to receive a rack of samples and being both offset from the transportation route;
    a separating surface passing through a centre of the platter, said separating surface being configured to prevent uncontrolled passage of a sample container towards the analysis zone during analysis of a sample,
    a rack slider configured to move a rack of samples between the transportation route and the waiting zone;
    wherein the platter is configured to displace a rack along the plane in order to allow out-and-return movements of said rack in both directions between the waiting zone and the analysis zone.

2. The transport unit according to claim 1, further comprising a rack displacement member configured to transport a rack of samples along the transportation route, wherein an operation of the rack displacement member is independent from a displacement of the platter.

3. The transport unit according to claim 1, wherein the rack slider comprises a sliding stopper, wherein a sliding of the sliding stopper occurs according to a second direction not parallel to the first direction.

4. The transport unit according to claim 1, wherein the platter is a rotary platter,
    the transport unit further comprising an actuator (151) which controls rotation of the rotary platter so as to move a rack of samples between the waiting zone and the analysis zone.

5. The transport unit according to claim 4, wherein the waiting zone and the analysis zone are symmetrical relative to an axis of rotation of the platter.

6. The transport unit according to claim 1, wherein the platter comprises a transfer zone, the transfer zone further extending on the transportation route.

7. The transport unit according to claim 1, wherein the separating surface is a glass pane.

8. The transport unit according to claim 1, wherein the platter is configured to allow displacement in translation of a rack of samples according to an additional direction not parallel to the first direction.

9. The transport unit according to claim 8, wherein the platter is mobile in translation according to the additional direction.

10. The transport unit according to claim 8, comprising:
    a transfer zone extending on the transportation route,
    a second waiting zone distinct from the waiting zone,
    a third waiting zone distinct from the waiting zone,
    the platter being configured to guide a rack of samples in any one of the waiting zone, the transfer zone, the second waiting zone, the analysis zone and the third waiting zone.

11. The transport unit according to claim 1, wherein the ends of the waiting zone and the ends of the analysis zone are aligned, a direction of extension of the waiting zone and a direction of extension of the analysis zone the ends of the being parallel to the first direction of the transportation route.

12. The transport unit according to claim 1, further comprising a stop element configured to come to stop against a rack of samples present on the transportation route.

13. The transport unit according to claim 1, wherein the transport unit is adapted to transport a rack of samples in a single direction along the transportation route, from the first end to the second end.

14. The transport unit according to claim 1, wherein a maximal width of the transport unit according to the first direction is less than or equal to twice a length of a rack.

15. An automatic diagnosis unit comprising:
    a first transport unit of containers of samples according to claim 1,
    a first handling unit of samples,
    the first handling unit of samples comprising:
        a displacement module configured to displace a sample container toward a sampling position,
        a needle support module, comprising a needle configured to take a sample from the sampling position,
        a processing unit configured to control displacement of the displacement module and of the needle support module.

16. The automatic diagnosis unit according to claim 15, the displacement module being configured to translate a container of samples according to a second additional direction and according to a third additional direction, the second additional direction being a direction of alignment of the analysis zone of the first transport unit.

17. The automatic diagnosis unit according to claim 15, further comprising:
    a second transport unit of containers of samples according to claim 1 associated with a second handling unit of samples comprising a displacement module, a needle support module and a processing unit, the second handling unit being preferably attached to the first handling unit,
    and/or further comprising an inlet bay comprising a first space for housing a rack of samples,
    and/or further comprising an outlet bay comprising a second space for housing a rack of samples,
    wherein the transportation route of the first transport unit of samples extends from the transportation route of the second transport unit of samples and/or extending from the first space (for housing a rack and/or extending from the second space for housing a rack.

18. The automatic diagnosis unit according to claim 17, wherein the first handling unit is configured to achieve a first maximal sample processing rate, said first maximal sample processing rate being separate from a second maximal processing rate of samples that the second handling unit is configured to achieve.

\* \* \* \* \*